United States Patent
Ananth et al.

(10) Patent No.: US 9,668,102 B1
(45) Date of Patent: May 30, 2017

(54) HIGH PENETRATION ALERTING FOR AIRBORNE LTE

(71) Applicant: Google Inc., Mountain View, CA (US)

(72) Inventors: Sharath Ananth, Cupertino, CA (US); Erik Stauffer, Sunnyvale, CA (US); Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/075,988

(22) Filed: Mar. 21, 2016

(51) Int. Cl.
| | |
|---|---|
| *H04W 24/00* | (2009.01) |
| *H04W 4/02* | (2009.01) |
| *H04W 4/14* | (2009.01) |
| *H04W 68/00* | (2009.01) |
| *H04W 72/04* | (2009.01) |
| *H04L 29/06* | (2006.01) |
| *H04W 72/08* | (2009.01) |
| *H04W 84/02* | (2009.01) |

(52) U.S. Cl.
CPC ......... *H04W 4/025* (2013.01); *H04L 65/4076* (2013.01); *H04W 4/14* (2013.01); *H04W 68/005* (2013.01); *H04W 72/0413* (2013.01); *H04W 72/085* (2013.01); *H04W 84/022* (2013.01)

(58) Field of Classification Search
CPC  H04B 7/18567; H04B 1/7075; H04B 1/7085; H04B 1/7087; H04B 7/18534; H04L 1/08; H04L 1/004; H04L 1/0071; H04W 4/14; H04W 68/00; H04W 28/06; H04W 4/025; H04W 84/022; H04W 88/185
USPC ....... 455/10, 13.4, 13.1, 436, 456, 437, 504; 370/317, 318, 209, 342, 441; 375/367, 375/E1.002, 149
See application file for complete search history.

(56) References Cited

U.S. PATENT DOCUMENTS

| | | |
|---|---|---|
| 5,363,426 A | 11/1994 | Nyhart |
| 5,974,092 A | 10/1999 | Roos et al. |
| 2012/0294220 A1 | 11/2012 | Gou |

*Primary Examiner* — Fred Casca
(74) *Attorney, Agent, or Firm* — Honigman Miller Schwartz and Cohn LLP

(57) ABSTRACT

A method for providing an alert notification to a user in a degraded location includes obtaining incoming call data indicating the mobile terminal is unable to establish a first communication link with a communication terminal for receiving an incoming call using voice over long term evolution. The method also includes providing the alert notification to a user associated with the mobile terminal based on the obtained incoming call data. The alert notification informs the user that the incoming call directed toward the mobile terminal is pending. The method also includes receiving the incoming call from the communication terminal after the mobile terminal moves away from the degraded location and establishes the first communication link with the communication terminal.

26 Claims, 10 Drawing Sheets

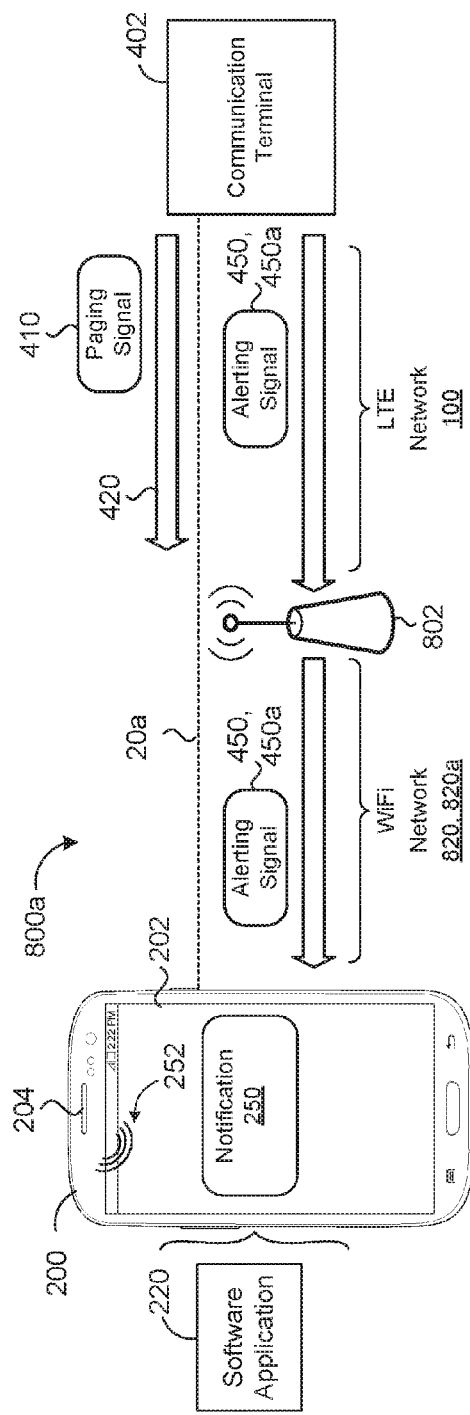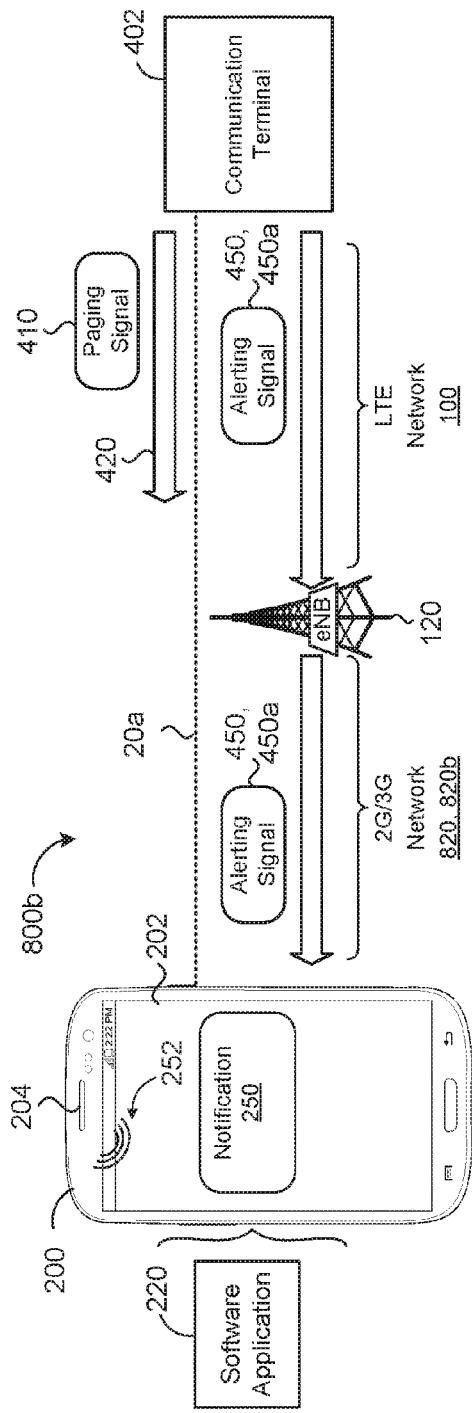

HIGH PENETRATION ALERTING FOR AIRBORNE LTE

TECHNICAL FIELD

This disclosure relates to informing a mobile terminal at a degraded location of an incoming call from a communication terminal using alerting signals.

BACKGROUND

Wireless communication networks provide communication content, such as voice, video, packet data, messaging, and broadcast. A wireless communication network may support operation on multiple carriers, each carrier including a range of frequencies used for communication and associated with system information describing operation of the carrier. A Long-Term Evolution (LTE) network provides wireless communication of high-speed data for User Equipment (UE) and communication terminals, such as ground base-stations and high altitude platforms (HAPs). LTE networks increase the capacity and speed of existing radio access network (RAN) technologies by using a different radio interface with core network improvements. The wireless communication network may include a number of communication terminals that can support communication for a number of UEs. A mobile terminal (e.g., UE) may communicate with a communication terminal via downlink and optionally an uplink.

When HAPs employ communications, the communication signals directed toward a target mobile terminal may become degraded or lost due to large building penetration loss, or when the target mobile terminal is otherwise located at a degraded location that does not receive coverage by the HAPs. The degradation of communication signals can result in the mobile terminal not having the ability to receive an incoming call and not being alerted of the incoming call. By contrast to outgoing calls, where a user may simply move to a location with better signal conditions, such as near a window, the user cannot take the same corrective action to receive an incoming call, because the timing of the incoming call is unknown to the user. Satellite systems are known to transmit special waveforms with signal waveform qualities that allow for deeper indoor penetration to alert a mobile terminal of an incoming call. However, LTE communications include waveforms defined by the LTE standard that do not provide an option for defining a special waveform for providing a high penetration alerting channel.

SUMMARY

One aspect of the disclosure provides a method for providing an alert notification to a user at a degraded location. The method includes obtaining, by data processing hardware of a mobile terminal, incoming call data indicating the mobile terminal is unable to establish a first communication link with a communication terminal for receiving an incoming call (e.g., using voice over long term evolution). The method also includes providing, by the data processing hardware, the alert notification to a user associated with the mobile terminal based on the obtained incoming call data. The alert notification informs the user that the incoming call directed toward the mobile terminal is pending. The method also includes receiving, at the data processing hardware, the incoming call from the communication terminal after the user moves the mobile terminal away from the degraded location and establishes the first communication link with the communication terminal.

Implementations of the disclosure may include one or more of the following optional features. In some implementations, obtaining the incoming call data includes, after the communication terminal transmits a paging signal at a first power level or a first effective isotropic radiated power to the mobile terminal that requests the mobile terminal to establish the first communication link, receiving, at the data processing hardware, an alerting signal including the incoming call data from the communication terminal through a network. The communication terminal may use a high power spot beam to transmit the alerting signal at a second power level or a second effective isotropic radiated power greater than the first power level or the first effective isotropic radiated power of the paging signal. The communication terminal may increase a gain associated with the high power spot beam relative to the paging signal to enable the mobile terminal to close an uplink with the communication terminal for receiving the alerting signal or the paging signal.

In some examples, receiving the alerting signal includes receiving a text message via the high power spot beam from the communication terminal and providing the alert notification includes displaying the text message on a graphical user interface executing on the mobile terminal. The text message may provide at least one of: status information informing the user that the incoming call is currently pending; contact information associated with an originator of the incoming call; or location information informing the user that the mobile terminal is located in an area with poor reception. The alerting signal received from the communication terminal may prompt an application executing on the mobile terminal to generate the alert notification and at least one of rendering the alert notification for display upon a graphical user interface executing on the mobile terminal, or control one or more speakers of the mobile terminal to produce an audio signal associated with the alert notification.

In response to receiving the alerting signal from the communication terminal, the method may include transmitting a connection request to the communication terminal to establish a second communication link with the communication terminal for receiving the incoming call and receiving, at the data processing hardware, the incoming call from the communication terminal through the second communication link. The communication terminal uses the high power spot beam to provide the incoming call through the second communication link.

In some examples, obtaining the incoming call data includes executing, by the data processing hardware, an alerting application on the mobile terminal. The alerting application may be configured to monitor a multicast-broadcast single-frequency network channel and receive an alerting signal directed toward the mobile terminal from the communication terminal on the multicast-broadcast single-frequency network channel. The alerting signal may include the incoming call data. The alerting application may further be configured to generate the alerting notification based on the detected alerting signal, and at least one of: render the alert notification for display upon a graphical user interface executing on the mobile terminal; or control one or more speakers of the mobile terminal to produce an audio signal associated with the alert notification. The communication terminal may include an antenna array providing multiple sectors. The communication terminal may be configured to increase a power level of the multicast-broadcast single-frequency network channel. In some examples, the communication terminal increases the power level of the multicast-broadcast single-frequency network channel by transmitting the alerting signal from each sector. In these examples, the communication terminal may combine the alerting signal from each sector using cyclic delay diversity.

In some implementations, the alerting application receives the alerting signal directed toward the mobile terminal by identifying a unique identifier associated with the mobile terminal included in the alerting signal. The alerting application may also monitor the multicast-broadcast single-frequency network channel according to a paging cycle when the mobile terminal is located within more than one multimedia broadcast/multicast service areas. Obtaining the incoming call data may include executing, by the data processing hardware, an alerting application on the mobile device. The alerting application may be configured to receive modem parameters from a modem executing on the mobile terminal, determine whether the modem parameters indicate multiple unsuccessful attempts by the modem to establish the first communication link with the communication terminal, and generate the alert notification when the received modem parameters indicate multiple unsuccessful attempts by the modem to establish the first communication link. The alerting application may further include rendering the alert notification for display upon a graphical user interface executing on the mobile terminal, or controlling one or more speakers of the mobile terminal to produce an audio signal associated with the alert notification. The alerting application may determine the modem parameters indicating multiple unsuccessful attempts by the modem to establish the first communication link when the received modem parameters include multiple unsuccessful random access channel attempts by the modem.

In some examples, obtaining the incoming call data includes receiving, at the data processing hardware, an alerting signal including the incoming call data over a non-long term evolution network. The received signal may prompt an alerting application executing on the mobile terminal to generate the alert notification and at least one of rendering the alert notification for display upon a graphical user interface executing on the mobile terminal, or controlling one or more speakers of the mobile terminal to produce an audio signal associated with the alert notification. Receiving the alerting signal may include receiving a text message over the non-long term evolution network and providing the alert notification may include displaying the text message on a graphical user interface executing on the mobile terminal. The text message may provide at least one of: status information informing the user that the incoming call is currently pending; contact information associated with an originator of the incoming call; or location information informing the user that the mobile terminal is located in an area with poor reception.

Another aspect of the disclosure provides a system for providing an alert notification to a user at a degraded location. The system includes a communication terminal, data processing hardware of a mobile terminal, and memory hardware in communication with the data processing hardware. The memory hardware stores instructions that when executed on the data processing hardware cause the data processing hardware to perform operations. The operations include obtaining incoming call data indicating the mobile terminal is unable to establish a first communication link with the communication terminal for receiving an incoming call using voice over long term evolution and providing the alert notification to the user associated with the mobile terminal based on the obtained incoming call data. The alert notification informs the user that the incoming call directed toward the mobile terminal is pending. The operations further include receiving the incoming call from the communication terminal after the user moves the mobile terminal away from the degraded location and establishes the first communication link with the communication terminal.

This aspect may include one or more of the following optional features. In some implementations, obtaining the incoming call data includes, after the communication terminal transmits a paging signal at a first power level or a first effective isotropic radiated power to the mobile terminal that requests the mobile terminal to establish the first communication link, receiving an alerting signal including the incoming call data from the communication terminal through a network. The communication terminal may use a high power spot beam to transmit the alerting signal at a second power level or a second effective isotropic radiated power greater than the first power level or the first effective isotropic radiated power of the paging signal. The communication terminal may increase a gain associated with the high power post beam relative to the paging signal to enable the mobile terminal to close an uplink with the communication terminal for receiving the alerting signal or the paging signal.

In some examples, receiving the alerting signal includes receiving a text message via the high power spot beam from the communication terminal. The text message may provide at least one of: status information informing the user that the incoming call is currently pending; contact information associated with an originator of the incoming call; or location information informing the user that the mobile terminal is located in an area with poor reception. Providing the alerting notification may include displaying the text message on a graphical user interface executing on the mobile terminal. The alerting signal received from the communication terminal may prompt an application executing on the mobile terminal to generate the alert notification and at least one of rendering the alert notification for display upon a graphical user interface executing on the mobile terminal, or controlling one or more speakers of the mobile terminal to produce an audio signal associated with the alert notification.

In response to receiving the alerting signal from the communication terminal, the operations may further include transmitting a connection request to the communication terminal to establish a second communication link with the communication terminal for receiving the incoming call, and receiving the incoming call from the communication terminal through the second communication link. The communication terminal may use the high power spot beam to provide the incoming call through the second communication link. Obtaining the incoming call data may include executing an alerting application on the mobile terminal. The alerting application may be configured to: monitor a multicast-broadcast single-frequency network channel; receive an alerting signal directed toward the mobile terminal from the communication terminal on the multicast-broadcast single-frequency network channel; and generate the alerting notification based on the detected alerting signal. The alerting signal may include the incoming call data. The alerting application may also be configured to render the alert notification for display upon a graphical user interface executing on the mobile terminal, or control one or more speakers of the mobile terminal to produce an audio signal associated with the alert notification.

In some implementations, the communication terminal includes an antenna array providing multiple sectors. The communication terminal may be configured to increase a power level of the multicast-broadcast single-frequency network channel. In some examples, the communication terminal increases the power level of the multicast-broadcast single-frequency network channel by transmitting the alerting signal from each sector. In these examples, the communication terminal may combine the alerting signal from each sector using cyclic delay diversity. The alerting application may receive the alerting signal directed toward the mobile terminal by identifying a unique identifier associated with the mobile terminal included in the alerting signal. The alerting application may monitor the multicast-broadcast single-frequency network channel according to a paging cycle when the mobile terminal is located within more than one multimedia broadcast/multicast service areas.

In some examples, obtaining the incoming call data includes executing an alerting application on the mobile terminal. The alerting application may be configured to: receive modem parameters from a modem executing on the mobile terminal; determine whether the modem parameters indicate multiple unsuccessful attempts by the modem to establish the first communication link with the communication terminal; and generate the alert notification when the received modem parameters indicate multiple unsuccessful attempts by the modem to establish the first communication link. The alerting application may also be configured to render the alert notification for display upon a graphical user interface executing on the mobile terminal, or control one or more speakers of the mobile terminal to produce an audio signal associated with the alert notification. The alerting application may further determine that the modem parameters indicate multiple unsuccessful attempts by the modem to establish the first communication link when the received modem parameters include multiple unsuccessful random access channel attempts by the modem. Obtaining the incoming call data may also include receiving an alerting signal including the incoming call data over a non-long term evolution network.

The received alerting signal may prompt an alerting application executing on the mobile terminal to generate the alert notification and at least one of: rendering the alert notification for display upon a graphical user interface executing on the mobile terminal; or controlling one or more speakers of the mobile terminal to produce an audio signal associated with the alert notification. Receiving the alerting signal may include receiving a text message over the non-long term evolution network and providing the alert notification may include displaying the text message on a graphical user interface executing on the mobile terminal. The text message may provide at least one of: status information informing the user that the incoming call is currently pending; contact information associated with an originator of the incoming call; or location information informing the user that the mobile terminal is located in an area with poor reception.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 8A and 8B are schematic views of a mobile terminal receiving an alerting signal from a communication terminal over a non-Long-Term Evolution (LTE) network.

Like reference symbols in the various drawings indicate like elements.

DETAILED DESCRIPTION

Long-Term Evolution (LTE) is a standard for wireless communication of high-speed data for mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD). LTE networks can include terrestrial networks associated with communication terminals positioned on earth, non-terrestrial networks associated with communication terminals not positioned on earth, or a network that supports LTE and includes both terrestrial and non-terrestrial networks. The communication terminals associated with terrestrial networks can include high altitude platforms (HAPs) released into the earth's atmosphere that operate at high altitudes. When a communication terminal (e.g., a HAP or base-station) deploys LTE communications to a target UE, scenarios may exist when signal conditions become degraded or lost when the target UE is located indoors due to building penetration loss, or when the UE is otherwise located in a dead zone of the communication terminal. In addition to preventing the target UE from the ability to receive an incoming call using Voice over LTE (VoLTE), a user associated with the target UE may be entirely unaware of the incoming call when the LTE communications are degraded or lost. Therefore, it is desirable to design a network that supports LTE communications and is capable of alerting a UE of an incoming call to provide a user associated with the UE with an opportunity to move the UE to a location with better signal conditions to receive the incoming call.

Figure 1:
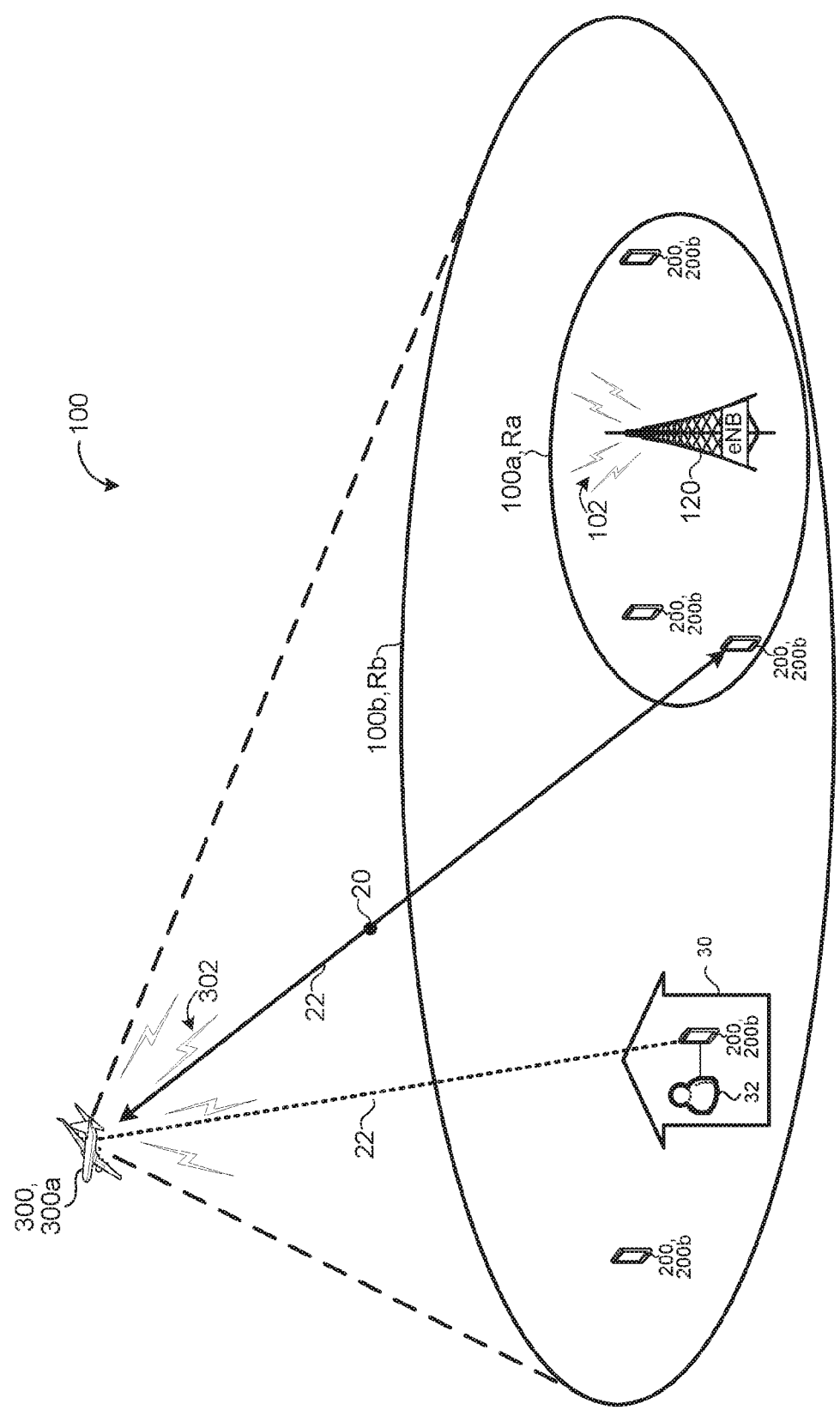
FIG. 1 is a schematic view of an exemplary communication system.

Referring to FIG. 1, in some implementations, a hybrid network 100 includes terrestrial network(s) 100a and non-terrestrial network(s) 100b. The terrestrial network 100a may include one or more of macrocell, femtocell, picocell, and microcell, each defining a coverage range of the network. The terrestrial network 100a includes multiple terrestrial base-stations 120. In some examples, the terrestrial base-stations 120 are Evolved node Bs (also referred to as eNode B or eNB). An eNB is hardware that connects to the mobile terrestrial network 100a and communicates directly with one or more User Equipment (UE) 200. As used herein, the terms UE 200 and "mobile terminal" are used interchangeably. The eNB 120 does not have a separate controller element, thus simplifying the architecture of the terrestrial network 100a (i.e., the hybrid network 100). The eNB 120 uses two E-UTRA protocols, the Orthogonal Frequency-Division Multiple Access (OFDMA) for downlink and the Single-carrier FDMA (SC-FDMA) for uplink. In addition, the eNB 120 embeds its own control functionality, since it does not include a separate controller element. The eNB 120 uses multiple protocols when interfacing with different elements. For example, the eNB 120 includes X2-interface using X2-AP protocol when communicating with other eNBs 120.

Figures 3A, 3B:
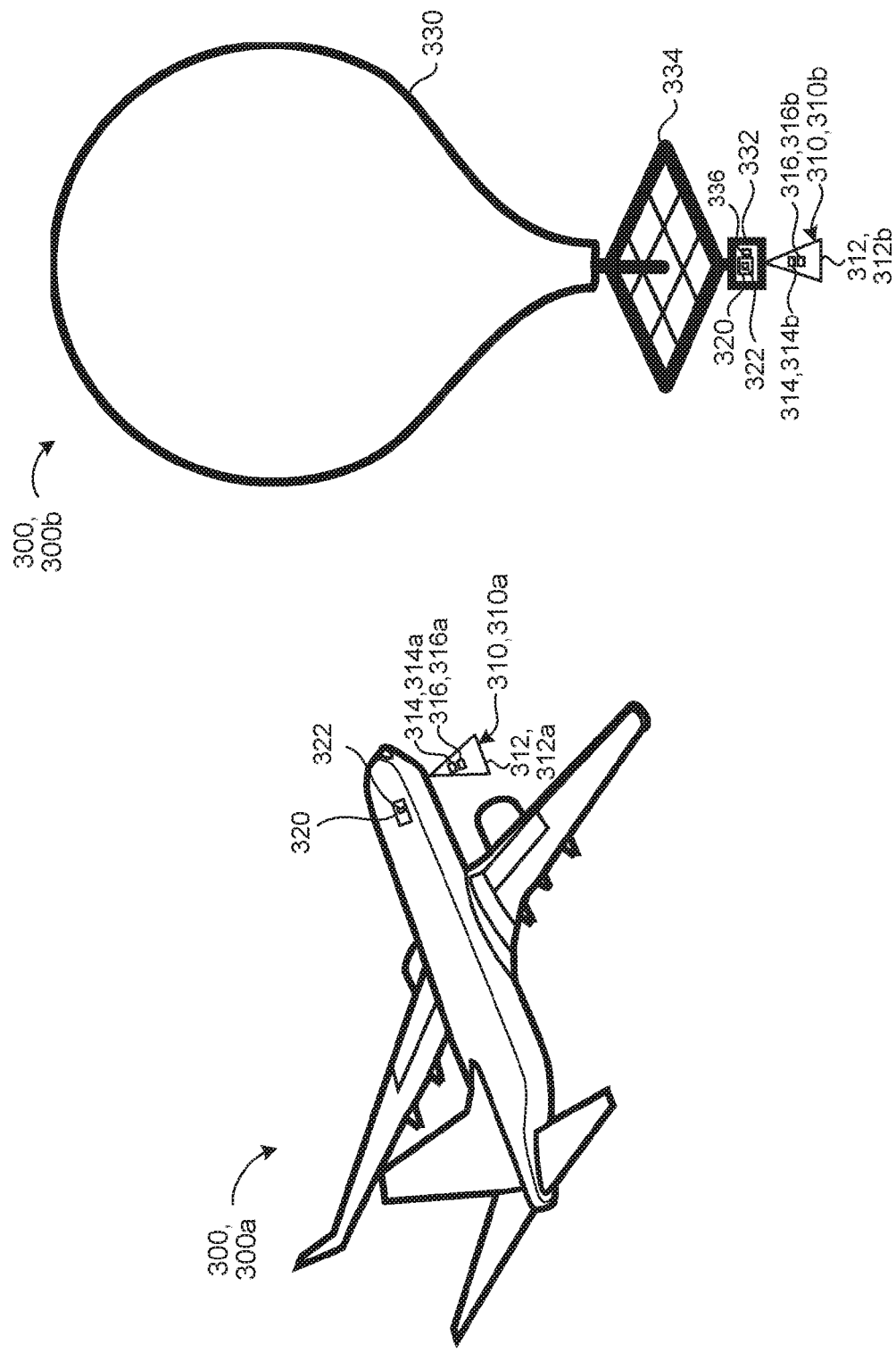
FIGS. 3A and 3B are perspective views of example high altitude platforms.

In some implementations, the non-terrestrial network 100b may include one or more HAPs 300. The HAPs 300 include aerial communication devices that operate at high altitudes (e.g., 17-22 km). Each HAP 300 may be released into the earth's atmosphere, e.g., by an air craft, or flown to the desired altitude. Moreover, the HAP 300 may operate as a quasi-stationary aircraft. In some examples, the HAP 300 is an aircraft 300a (FIG. 3A), such as an unmanned aerial vehicle (UAV); while in other examples, the HAP 300 is a communication balloon 300b (FIG. 3B). The HAP 300 may transmit/receive LTE-based communications 22 to/from UEs 200 located within the non-terrestrial network 100b.

In some implementations, the non-terrestrial network 100b is deployed in areas where the terrestrial network 100a already exists, and therefore, the non-terrestrial network 100b must consider and coexist with existing or legacy software architecture employed by the terrestrial network 100a. Thus, the introduction of non-terrestrial signals 302 (e.g., LTE signals) from a HAP 300 to the network 100 may interfere with terrestrial signals 102, such as 2G/3G/4G LTE signals, from a base-station 120 of the terrestrial network 100a. The non-terrestrial network 100b may provide a geographical coverage region Rb that is larger than a geographical coverage region Ra provided by the terrestrial network 100a.

Carrier aggregation or channel aggregation (CA) may be used to overcome the interference caused by the terrestrial network 100a and the non-terrestrial network 100b. UEs 200 located in a coverage area of multiple carriers may achieve wider bandwidth and higher data rates by using multiple carriers simultaneously. CA increases the bandwidth of a communication link 20 and thereby increasing the bitrate, mainly used in LTE systems. CA may be used for both Frequency-Division Duplexing (FDD) and Time-Division Duplexing (TDD). FDD refers to the transmitting device (e.g., HAP 300) and the receiving device (e.g., UE 200) operating at different carrier frequencies; while TDD refers to applying time-division multiplexing to separate transmit and receive signals using the same carrier frequency. A carrier signal is a transmitted electromagnetic pulse or wave at a steady base frequency of alternation on which information is imposed by increasing signal strength, varying the wave phase, or other means, i.e., modulation.

In some implementations, structures, such as buildings 30, create penetration loss to the LTE signals 302 from a HAP 300 to a target UE 200 located indoors within the building 30. The penetration loss can result in the inability for the target UE 200 to establish a communication link 20 with the HAP 300 for receiving communications 20 such as an incoming call directed toward the UE 200 using VoLTE. For instance, FIG. 1 shows an open communication link 20 between the HAP 300 and the UE 200 located within the building 30. The dashed line indicates the communication link 20 is open, and thus not established. In some instances, the HAP 300 is able to provide LTE signals having a low data rate to the UE 200 on the downlink, but there is insufficient margin in the uplink for the UE 200 to close and establish the communication link 20 when the UE 200 is at a degraded location, e.g., within the building 30. Thus, even if the HAP 300 is able to successfully page the UE 200 in a degraded location (e.g., within a building 30) to establish the communication link 20 for receiving a communication 22, such as an incoming call, a user 32 associated the UE 200 may not be informed of the incoming call due to the inability of the UE 200 to acknowledge the page from the HAP 300 for establishing the communication link 20 with the HAP 300.

Figure 2:
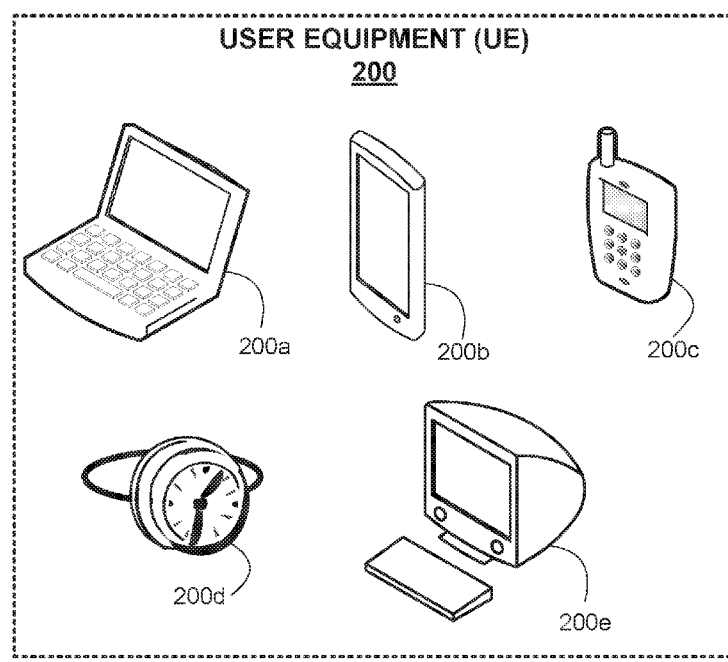
FIG. 2 is a perspective view of example user equipment.

Referring to FIG. 2, UEs 200 may be any telecommunication device capable of transmitting and/or receiving voice/data over the network 100. UEs 200 may include, but are not limited to, mobile computing devices, such as laptops 200a, tablets 200b, smart phones 200c, wearable computing devices 200d (e.g., headsets and/or watches), smart books, netbooks, cordless phones, wireless local loop (WLL) stations, and Bluetooth devices. UEs 200 may also include other computing devices having other form factors, such as computing devices included in desktop computers 200e, vehicles, gaming devices, televisions, or other appliances (e.g., networked home automation devices and home appliances). The UEs 200 are configured to support one or more wireless technologies, such as, but not limited to, Long Term Evolution (LTE), Wideband Code Division Multiple Access (WCDMA), CDMA IX, Evolution-Data Optimized (EVDO), Time Division Synchronous Code Division Multiple Access (TD-SCDMA), Global System for Mobile Communications (GSM), IEEE 802.11.

Referring to FIGS. 3A and 3B, in some implementations, the HAP 300 is an aircraft 300a or a communication balloon 300b and includes an antenna system 310 that receives/transmits a communication 22 from a UE 200. In some examples, the antenna system 310 is a phased array antenna system (e.g., tracking antenna) that includes a wideband active phased array antenna 312 and antenna data processing hardware 314. In some examples, the antenna data processing hardware 314 is part of the HAP data processing hardware 320, 320a, 320b. The phased array antenna system 310 provides fast beam steering, which is the ability to generate simultaneous beams and dynamically adjust the characteristics of the beam patterns. The phased array antenna 312, 312a, 312b includes a set of individual antennas that transmit and/or receive radio waves. The individual antennas are connected together in such a way that the individual current of each antenna has a specific amplitude and phase relationship, allowing the individual antennas to act as a single antenna. The relative phases of the respective signals feeding the antennas of the phased array antenna are set in a manner that an effective radiation pattern of the array is reinforced in a desired direction and suppressed in undesired directions. The phase relationships between the individual antennas may be fixed (e.g., a tower array antenna), or adjustable (e.g., beam steering antenna). In some examples, the phased array antenna 312, 312a, 312b includes antennas disposed on a micro strip and a phase shifter connected to at least one of the antennas. Moreover, the wideband active phased array antenna 312, 312a, 312b allows the transmission of the message bandwidth, which significantly exceeds the coherence bandwidth of the channel. In some examples, active phased array antennas 312, 312a, 312b incorporate transmit amplification with phase shift in each antenna element or group of elements.

The antenna data processing hardware 314, 314a, 314b of the phased array antenna system 310 may include the tracking device 316, 316a, 316b or may be in communication with the tracking device 316, 316a, 316b. The data processing hardware 314, 314a, 314b of the phased array antenna system 310 is configured to identify a target coverage area (e.g., the non-terrestrial network 100b) for allowing communication 22 to be transmitted/received between the phased array antenna system 310 and UEs 200 (e.g., UEs 200 having a line-of-sight with the phased array antenna 312) and establish a communication connection or link 20 between the target HAP 300 and the UE(s) 200. However, building penetration loss may obstruct the communication 22 from reaching a UE 200 located within a building or other structure, or may prevent the UE 200 from the ability to establish the communication link 20 with the target HAP 300.

In some examples, the HAP 300 includes a data processing device 320 that processes the received communication 22 and determines a path of the communication 22 to arrive at a destination UE 200. The data processing device 320 may include a modem 322 that processes the received communication before transmitting it to a destination (i.e., between two UEs 200).

FIG. 3A shows an example aircraft 300a, such as an unmanned aerial vehicle (UAV). A UAV, also known as a drone, is an aircraft without a human pilot onboard. There are two types of UAVs, autonomous aircrafts and remotely piloted aircraft. As the name suggests, autonomous aircrafts are designed to autonomously fly, while remotely piloted aircrafts are in communication with a pilot who pilots the aircraft. In some examples, the aircraft 300a is remotely piloted and autonomous at the same time. The UAV usually includes wings to maintain stability, a Global Positioning System (GPS) to guide it through its autonomous piloting, and a power source (e.g., internal combustion engine or electric battery) to maintain long hours of flight. In some examples, the UAV is designed to maximize efficiency and reduce drag during flight. Other UAV designs may be used as well.

FIG. 3B shows an example communication balloon 300b that includes a balloon 330 (e.g., sized about 49 feet in width and 39 feet in height and filled with helium or hydrogen), an equipment box 332, and solar panels 334. The equipment box 332 includes a location data processing device 336 that executes algorithms to determine where the communication balloon 300b needs to go. Each communication balloon 300b moves into a layer of wind blowing in a direction that may take it where it should be going. The equipment box 332 also includes batteries to store power and a transceiver (e.g., in communication with an antenna (not shown)) to communicate with other HAPs 300. The solar panels 334 may power the equipment box 332. In some examples, the equipment box 332 includes the data processing device 320, which includes the modem 322.

Communication balloons 300b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 300b float in the stratosphere, at an altitude twice as high as airplanes and the weather (e.g., 20 km above the earth's surface). The high-altitude balloons 300b are carried around the earth by winds and can be steered by rising or descending to an altitude with winds moving in the desired direction. Winds in the stratosphere are usually steady and move slowly at about 5 and 20 mph, and each layer of wind varies in direction and magnitude.

Figure 4:
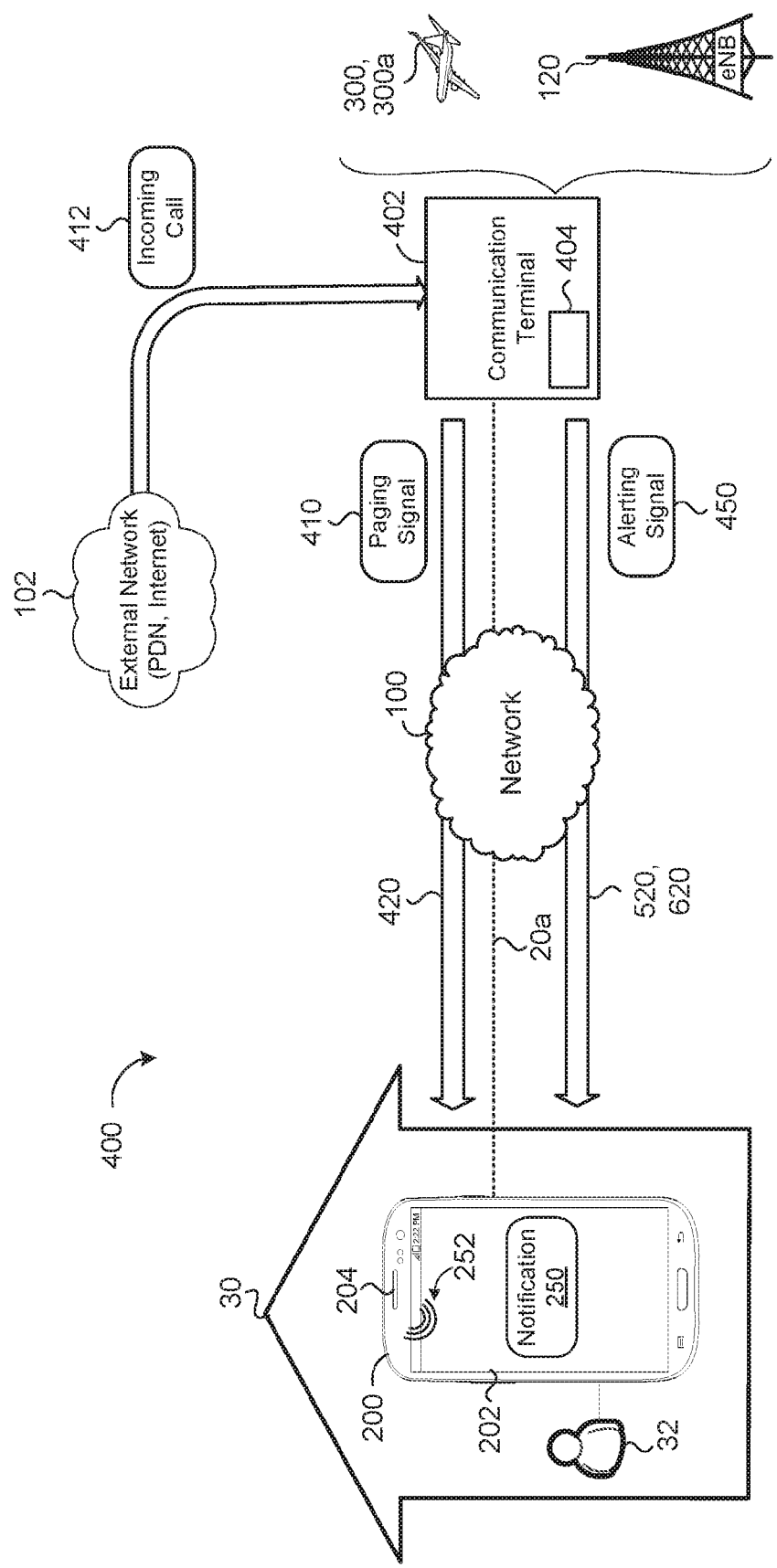
FIG. 4 is a schematic view of an example communication system of a communication terminal transmitting an alerting signal to a mobile terminal that informs the mobile terminal of an incoming call.

FIG. 4 shows an example communication system 400 of a terminal 402 transmitting a paging signal 410 to an example mobile terminal (e.g., UE) 200 through the network 100 that requests the mobile terminal 200 to establish a first communication link 20a for receiving an incoming call 412 using VoLTE. The terminal 402 may receive the incoming call 412 from an external network 100, e.g., a packet data network (PDN) or the Internet, in communication with the terminal 402. In some implementations, the terminal 402 is a HAP 300 operating at a high altitude within the Earth's atmosphere. In other implementations, the terminal 402 is a ground base-station 120 or eNB. The mobile terminal 200 may be located at a degraded location within a building 30 that prevents the mobile terminal 200 from establishing the communication link 20a for receiving the incoming call 412. In other scenarios, the mobile terminal 200 may be at a degraded location when located near an edge of a geographical coverage region Ra, Rb provided by the communication terminal 402.

The terminal 402 transmits the paging signal 410 through the network 100 (e.g. LTE network) via a downlink channel 420. The paging signal 410 may be associated with a low data rate providing only enough data to request the mobile terminal 200 to establish the communication link 20a for receiving the incoming call 412. The downlink channel 420 providing the paging signal 410 may include a Physical Downlink Shared Channel (PDSCH) or a Physical Downlink Control Channel. In some examples, the mobile terminal 200 successfully receives the paging signal 410 from the terminal 402 but is unable close an uplink with the communication terminal 402 to establish the communication link 20. In other examples, the mobile terminal 200 never receives the paging signal 410. Whether the mobile terminal 200 fails to receive the paging signal 410, or receives the paging signal 410 but is unable to establish the communication link 20a, a user 32 associated with the mobile terminal 200 is left unaware of the incoming call 412.

The terminal 402 may employ control circuitry or data processing hardware 404 (e.g., antenna data processing hardware 314 and/or HAP data processing hardware 320) that determines whether or not the first communication link 20a is established after transmitting the paging signal 410. When the communication link 20a has not been established and is open, the terminal 402 may transmit an alerting signal 450 to the mobile terminal 200. The alerting signal 450 includes incoming call data indicating that the mobile terminal 200 is unable to establish the communication link 20a for receiving the incoming call 412. To put another way, the mobile terminal 200 uses the incoming call data included in the alerting signal 450 to inform a user 32 associated with the mobile terminal 200 of the incoming call 412. In some examples, the data processing hardware 404 of the terminal 402 transmits the alerting signal 450 when the communication link 20 remains open after a predetermined amount since transmitting the paging signal 410. The dotted line in FIG. 4 indicates the communication link 20a is open. In some implementations, the communication terminal 402 uses a high power spot beam 520 (FIG. 5) to transmit the alerting signal 450 to the mobile terminal 200. In other implementations, the communication terminal 402 transmits the alerting signal 450 on a multicast-broadcast single-frequency network (MBSFN) channel 620 (FIG. 6). The communication terminal 402 may employ any suitable technique for transmitting the alerting signal 450 over the network 100 to ensure that the mobile terminal 200 at the degraded location successfully receives the alerting signal 450.

In some implementations, in response to receiving the alerting signal 450 from the communication terminal 402, the mobile terminal 200 provides an alert notification 250 to a user 32 associated with the mobile terminal 200. The alert notification 250 informs the user 32 that the incoming call 412 directed toward the mobile terminal 200 is pending. In some examples, the mobile terminal 200 provides the alert notification 250 by displaying the alert notification 250 on a graphical user interface (GUI) 202 executing on the mobile terminal 200. Additionally or alternatively, the mobile terminal 200 may control one or more speakers 204 to produce an audio signal 252 associated with the alert notification 250. That is, the audio signal 252 includes a special alert notification audio signal 252 to inform the user 32 of the pending incoming call 412 with or without the user 32 having to visually view the alert notification 250 upon the GUI 202. Thus, the alert notification 250 may correspond to a visual alert notification for display upon the GUI 202 and/or an audio alert notification output from the speakers 204. The alert notification 250 can provide the user 32 with information including, but not limited to, status information 452 (FIG. 5A) informing the user 32 that the incoming call 412 is currently pending, contact information 454 (FIG. 5A) associated with an originator of the incoming call, and/or location information 456 (FIG. 5A) informing the user 32 that the mobile terminal 200 is located at a degraded location indicative of an area with degraded/poor reception. Accordingly, the user 32 may move the mobile terminal 200 away from the degraded location to a location providing better reception so that the first communication link 20a can be established for receiving the incoming call 412. For instance, the user 32 may move to a location near a window within the building 30 that provides better reception to establish the communication link 20a.

Figure 5A:
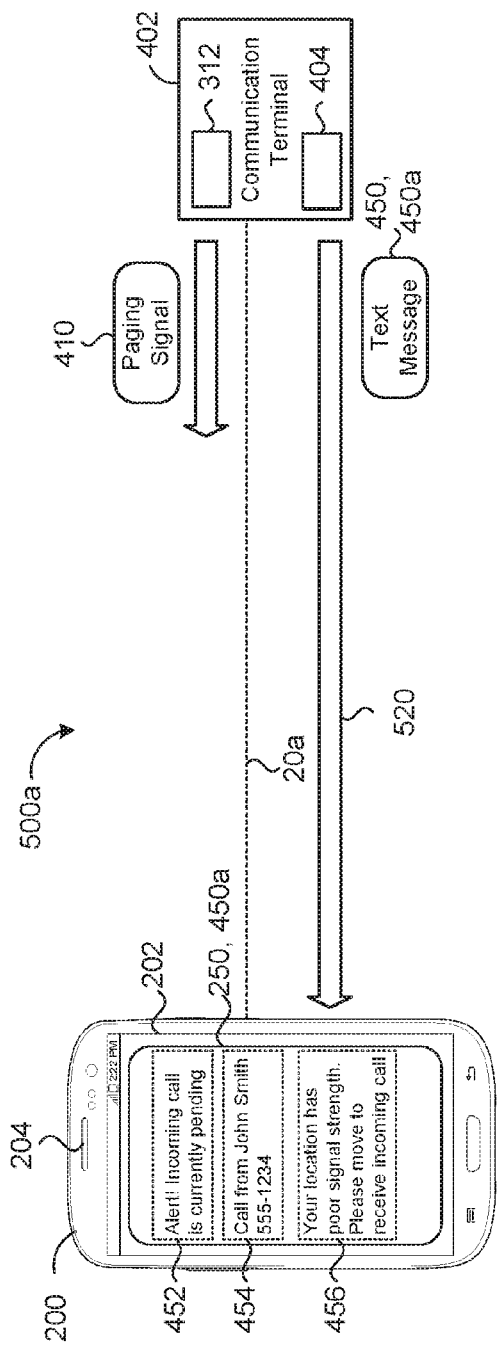
FIGS. 5A and 5B are schematic views of a communication terminal using a high power spot beam to transmit an alerting signal to a mobile terminal.
Figure 5B:
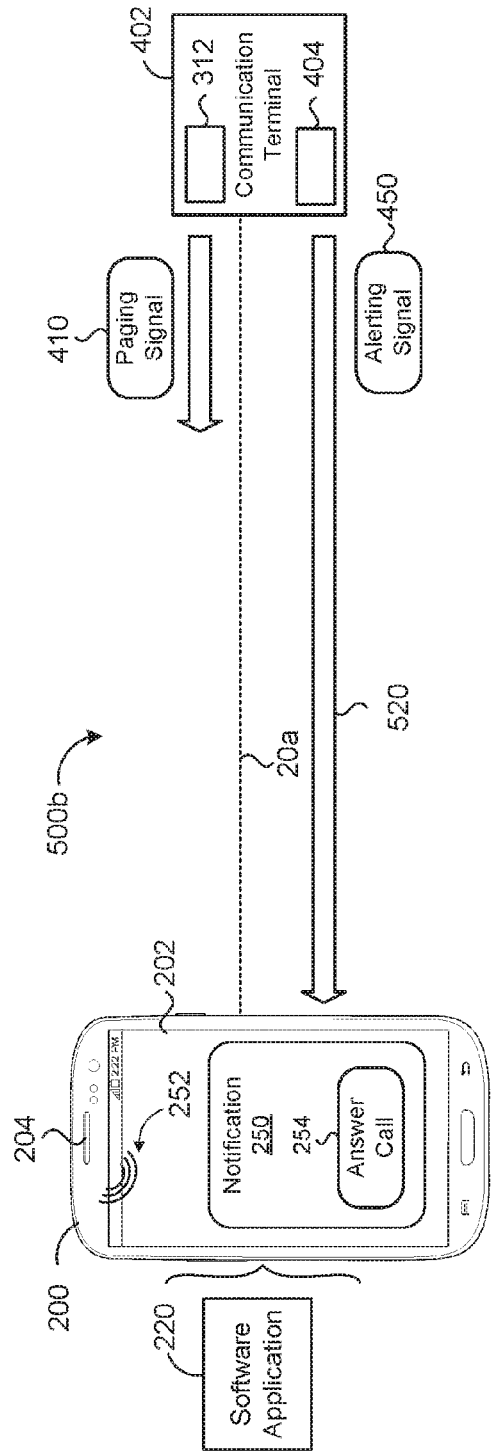
Figure 6:
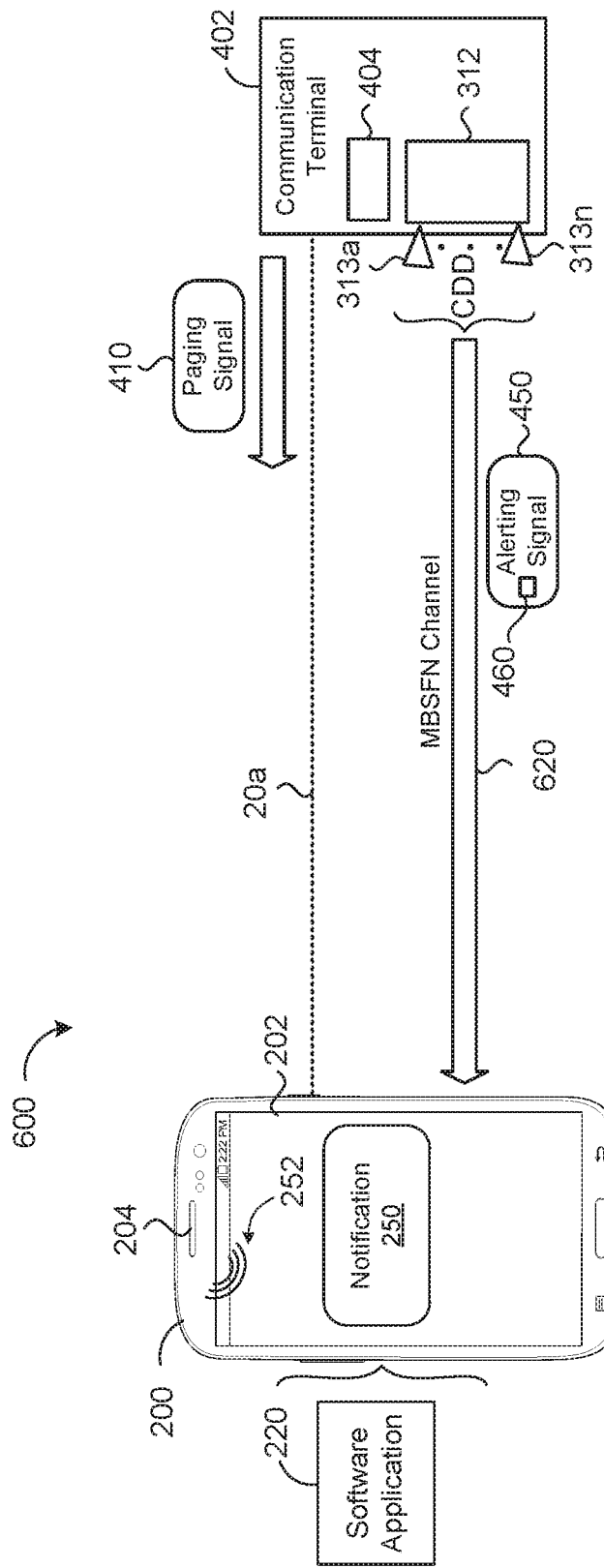
FIG. 6 is a schematic view of a communication terminal transmitting an alerting signal to a mobile terminal on a multicast-broadcast single-frequency network (MBSFN) channel.

Referring to FIGS. 5A and 5B, schematic views 500a, 500b show the communication terminal 402 using a high power spot beam 520 to transmit the alerting signal 450 to the mobile terminal 200 through the network 100. The communication terminal 402 may transmit the paging signal 410 at a first power level or an Effective Isotropic Radiated Power (EIRP) to the mobile terminal 200. The EIRP is the apparent power transmitted towards a receiver, if it is assumed that the signal is radiated equally in all directions, such as a spherical wave emanating from a point source. In other words, the EIRP is the arithmetic product of the power supplied to an antenna and its gain. The communication terminal 402 determines whether the mobile terminal 200 has established the first communication link 20a for receiving the incoming call 412. For instance, the communication terminal 402 may determine the first communication link 20a is established upon receiving a Physical Random Access Channel (PRACH) signal from the mobile terminal 200 and transmitting a Random Access Response (RAR) back to the mobile terminal 200. When the communication terminal 402 determines that the communication link 20a has not been established after a predetermined period of time has elapsed since transmitting the paging signal 410, the communication terminal 402 may assume that the mobile terminal 200 is located at a degraded location and transmits the alerting signal 450 using the high power spot beam 520 to inform the mobile terminal 200 of the incoming call 412 and the inability to establish the first communication link 20a while the mobile terminal 200 is at a degraded location. After some time, if a communication link 20a has not been established the communication terminal 402 may: (a) transmit the same signal using a high power spot beam; (b) transmit the same signal with higher power; (c) transmit the same signal using a high power spot beam and with higher power; (d) transmit an alerting signal (e.g., MBSFN, etc,); or (e) alert from another network like 2g/3g/wifi. The communication terminal 402 may employ a phased array antenna system 312 to increase a gain of the high power spot beam 520 relative to a gain of the paging signal 410 to transmit the high power spot beam 520 at a second power level or a second EIRP greater than the first power level associated with the paging signal 410. In doing so, the higher gain associated with the high power spot beam 520 enables the mobile terminal 200 to close an uplink so that the communication terminal 402 can successfully transmit the alerting signal 450 through the high power spot beam 520 to the mobile terminal 200. The high power spot beam 520 may be associated with a narrow-low data rate exclusively used for closing the link to provide the alerting signal 450 that includes the incoming call data to inform the mobile terminal 200 of the pending incoming call 412.

Referring to FIG. 5A, in some implementations, the mobile terminal 200 receives the alerting signal 450 as a text message 450a via the high power spot beam 520 from the communication terminal 402. The text message 450a may provide at least one of status information 452 informing the user 32 that the incoming call 412 is currently pending, contact information 454 associated with an originator of the incoming call 412; or location information 456 informing the user 32 that the mobile terminal 200 is located in a degraded area. The contact information 454 may include a name and/or phone number associated with the originator of the incoming call 412. In response to receiving the text message 450a, the mobile terminal 200 provides the alert notification 450 by displaying the text message 450a on the GUI 202 executing on the mobile terminal 200. FIG. 5A shows the GUI 202 displaying the status information 452, the contact information 454, and the location information 456 associated with the text message 450a. Accordingly, the alert notification 450 provides the user 32 with an opportunity to move the mobile terminal 200 to an area with better signal strength to establish the first communication link 20a for receiving the incoming call 412 using VoLTE.

Referring to FIG. 5B, in some implementations, the mobile terminal 200 executes one or more software applications 220. A software application 220 may refer to computer software that, when executed by a computing device, causes the computing device to perform a task. In some examples, the software application 220 may be referred to as an "application", an "app", or a "program". Example software applications 220 include, but are not limited to, word processing applications, spreadsheet applications, messaging applications, media streaming applications, social networking applications, and games.

Applications 220 can be executed on a variety of different mobile terminals (e.g., UE) 200. In some examples, applications 220 are installed on the mobile terminal 200 prior to the user 32 purchasing the mobile terminal 200. In other examples, the user 32 may download and install applications 220 on the mobile terminal 200.

In some implementations, the mobile terminal 200 executes an alerting application 220 that wirelessly communicates with the network 100 to receive the alerting signal 450 from the communication terminal 402, e.g., via the high power spot beam 520, and generate the alert notification 250 based on the incoming call data included in the alerting signal 450. The alerting application 220 may cause the mobile terminal 200 to close the high power spot beam 520 via uplink signaling to permit the communication terminal 402 to transmit the alerting signal 450. In some examples, the alerting signal 450, when received at the mobile terminal 200, prompts the alerting application 220 to generate the alert notification 250 and at least one of render the alert notification 250 for display upon the GUI 202 or control the one or more speakers 204 to produce an audio signal 252 associated with the alert notification 250. That is, the audio signal 252 includes a special alert notification audio signal 252 to inform the user 32 of the pending incoming call 412. Accordingly, the alerting application 220 may generate the alert notification 250 to provide the user 32 with an opportunity to move the mobile terminal 200 to an area with better signal strength to establish the first communication link 20a for receiving the incoming call 412 using VoLTE. Optionally, the alerting application 220 may render a graphical button 254 on the GUI 202, that when selected by the user 32, enables the mobile terminal 200 to receive the incoming call 412 over the high power spot beam 520 from the communication terminal 402. Here, the high power spot beam 520 may provide the incoming call 412 using 4GLTE, 2G, 3G, or other wireless communications such as Worldwide Interoperability for Microwave Access (WiMAX).

Referring to FIG. 6, a schematic view 600 shows the communication terminal 402 transmitting the alerting signal 450 to the mobile terminal 200 on a MBSFN channel 620. The communication terminal 402 may transmit the paging signal 410 to the mobile terminal 200 and determine (e.g., via the data processing hardware 404) whether the first communication link 20a for receiving the incoming call 412 has been established within the predetermined period of time since transmitting the paging signal 410. The communication terminal 402 may assume that the mobile terminal 200 is located in a degraded location when the first communication link 20a has not been established and transmit the alerting signal 450 to the mobile terminal 200 on the MBSFN channel 620 to inform the mobile terminal 200 of the incoming call 412. Conversely to using the high power spot beam 520 of FIGS. 5A and 5B, which requires the mobile terminal 200 to close the uplink before the communication terminal 402 can transmit the alerting signal 450, the MBSFN channel 620 allows the communication terminal 402 to transmit the alerting signal 450 without requiring any uplink signaling from the mobile terminal 200.

The communication terminal 402 may increase a power level of the MBSFN channel 620 relative to other channels when transmitting the alerting signal 450 such that the alerting signal 450 includes a signal strength sufficient for successfully reaching the mobile terminal 200 at the degraded location. By only increasing the power of the MBSFN channel 620, the communication terminal 402 can manage power consumption. In some implementations, the communication terminal 402 employs the phased array antenna system 312 to provide transmission coverage over multiple sectors 313a-n (e.g., antenna elements), thereby enabling the communication terminal 402 to increase the power level of the MBSFN channel 620 by transmitting the alerting signal 450 from each sector 313a-n using cyclic delay diversity (CCD).

Additionally, the MBSFN channel 620 may be implemented in terrestrial networks by transmitting the same alerting signal 450 from multiple terrestrial networks each separated by distance from one another. In these scenarios, the communication terminals associated with the terrestrial networks can all transmit the same alerting signal 450 and use a cyclic prefix in the mobile broadband service (MBS) frames to allow for different arrival times of the alerting signal 450 at the mobile terminal 200 to be treated as multipath. Employing additional communication terminals may increase the coverage area and increase the signal strength of the alerting signal 450. In some examples, when communication terminals get closer together, a time difference between the terminals no longer appears as a multipath, but instead the signals appear to beamform and cause constructive and destructive interference. Cyclic delay allows the alerting signal 450 received by the mobile terminal 200 to appear as multipath. Accordingly, cyclic delay can alleviate implications of interference when communication terminals transmitting the same signal are close to each other.

In some implementations, the mobile terminal 200 executes the alerting application 220 to monitor the MBSFN channel 620 and receive the alerting signal 450 directed toward the mobile terminal 200 from the communication terminal 402 on the MBSFN channel 620. The alerting application 220 may obtain scheduling information for different multimedia broadcast/multicast service (MBMS) areas associated with the mobile terminal to determine a paging cycle for monitoring the MBSFN channel 620 such that the alerting application 220 does not need to monitor all MBMS subframes. In some examples, alerting signal 450 transmitted by the communication terminal 402 includes a unique identifier 460 associated with the target mobile terminal 200. While monitoring the MBSFN channel 620, the alerting application 220 may receive the alerting signal 450 directed toward the mobile terminal 200 by identifying that the unique identifier 460 included in the alerting signal 450 is associated with the mobile terminal 200. In response to receiving the alerting signal 450, the alerting application 220 may generate the alert notification 250 based on the incoming call data included in the received alerting signal 450 and at least one of render the alert notification 250 for display upon the GUI 202, or control the one or more speakers 204 to produce the audio signal 252 associated with the alert notification 250. Accordingly, the alerting application 220 may generate the alert notification 250 to provide the user 32 with an opportunity to move the mobile terminal 200 to an area with better signal strength to establish the first communication link 20a for receiving the incoming call 412 using VoLTE.

Figure 7:
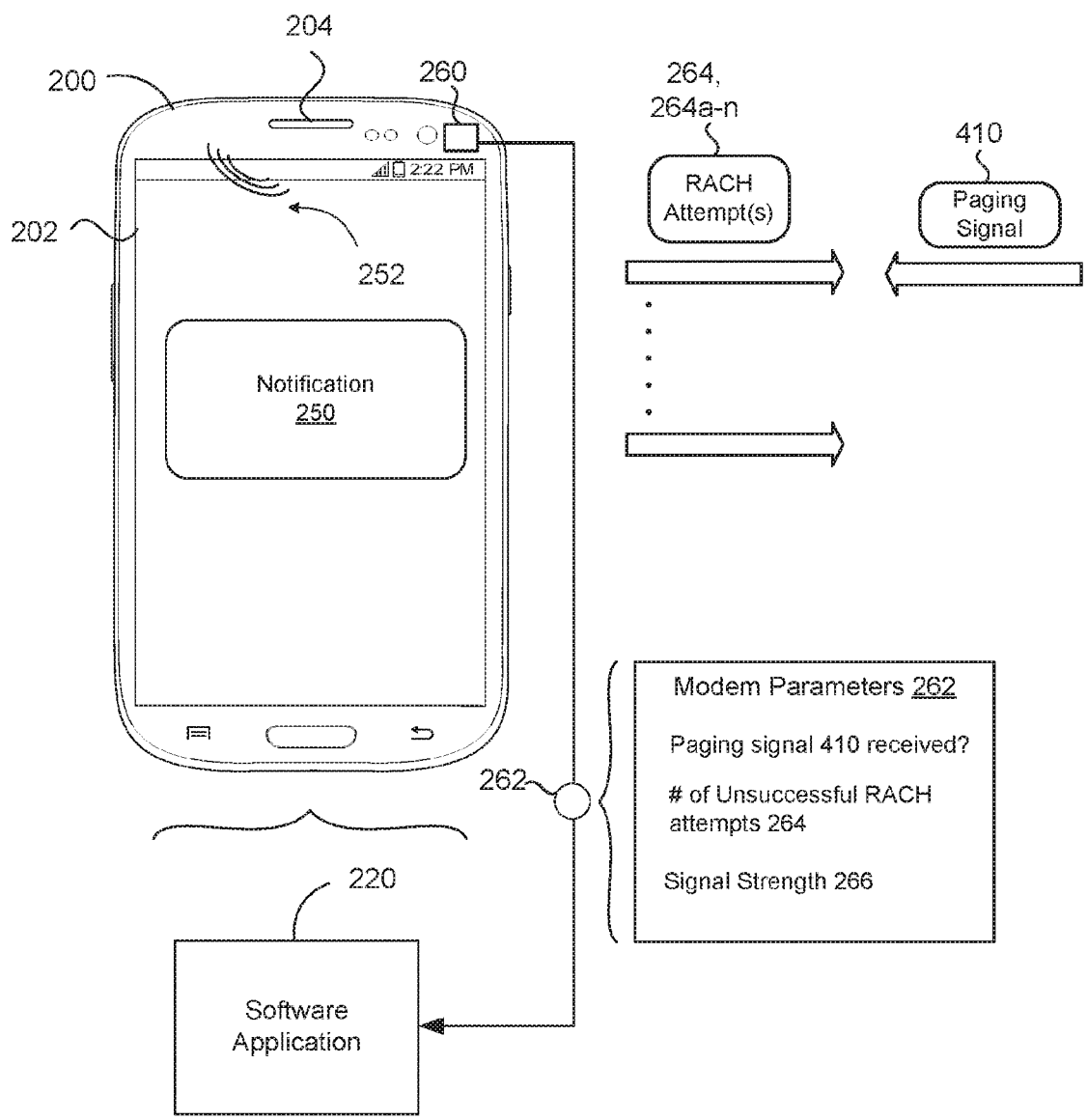
FIG. 7 is a schematic view of an example mobile terminal using modem parameters to obtain incoming call data.

FIG. 7 shows an example mobile terminal 200 obtaining the incoming call data informing the mobile terminal 200 of the incoming call 412 without receiving an alerting signal 450 from the communication terminal 402. In some implementations, the mobile terminal 200 executes an alerting application 220 in communication with a modem 260 executing on the mobile terminal 200. The alerting application 220 is configured to receive modem parameters 262 from the modem 260 and determine whether the modem parameters 262 indicate multiple unsuccessful attempts by the modem 260 to close the uplink for establishing the first communication link 20a with the communication terminal 402. Thus, modem parameters 262 indicating multiple unsuccessful attempts by them modem 260 to close the uplink provides a correlation that the incoming call 412 directed toward the mobile terminal 200 is currently pending. The modem parameters 262 may provide information including, but not limited to, whether or not the modem 260 has received a paging signal 410 from the communication terminal 402, a number of unsuccessful RACH attempts 264, 264a-n by the modem 260, and/or a signal strength 266 at the modem 262. In some examples, the alerting application 220 determines multiple unsuccessful attempts by the modem 260 to close the uplink when the number of unsuccessful RACH attempts 264 after receiving the paging signal 410 exceeds a threshold. In other examples, the alerting application 220 may determine that the modem 260 is unable to close the uplink, and thus unable to establish the first communication link 20a, when the modem 260 receives the paging signal 410 and the signal strength 266 of the modem 260 is less than a signal strength threshold. Optionally, the alerting application 220 may require that both the signal strength 266 is less than the signal strength threshold and the number of unsuccessful RACH attempts 264 exceeds the threshold after receiving the paging signal 410 to determine the incoming call 412 is currently pending.

When the alerting application 220 determines the received modem parameters 262 indicate multiple unsuccessful attempts by the modem 260 to close the uplink for establishing the first communication link 20a, the alerting application 220 generates the alert notification 250 based on the received modem parameters 262 and at least one of renders the alert notification 250 for display upon the GUI 202, or controls the one or more speakers 204 to produce the audio signal 252 associated with the alert notification 250. Accordingly, the alerting application 220 may generate the alert notification 250 to provide the user 32 with an opportunity to move the mobile terminal 200 to an area with better (e.g. increased) signal strength 266 to establish the first communication link 20a for receiving the incoming call 412 using VoLTE.

In some implementations, a modem software application 220 associated with the modem 260 is configured to monitor the modem parameters 262 and generate the alert notification 250 when the modem parameters 262 are indicative of multiple unsuccessful attempts by the modem 262 to close the uplink for establishing the communication link 20a with the communication terminal. Moreover, the modem software application 220 may render the notification 250 upon the GUI and/or control the speakers 204 to produce the audio signal 252 associated with the notification 250.

Referring to FIGS. 8A and 8B, schematic views 800a, 800b show the mobile terminal 200 receiving the alerting signal 450 including the incoming call data from the communication terminal 402 over a non-LTE network 820, 820a-b. The communication terminal 402 transmits the paging signal 410 to the mobile terminal 200 through the LTE network 100 via the downlink channel 420, and when the communication terminal 402 determines the mobile terminal 200 fails to establish the communication link 20a for receiving the incoming call 412 using VoLTE, the communication terminal 402 transmits the alerting signal 450 initially over the LTE network 100.

Referring to FIG. 8A, in some implementations, an access point 802 in communication with the communication terminal 402 receives the alerting signal 450 from the communication terminal 402 and provides the alerting signal 450 over a Wireless Fidelity (WiFi) (e.g., 802.11) network 820a. The WiFi network 820a may include various types of networks, such as a local area network (LAN) or a wide area network (WAN). In some examples, the mobile terminal 200 executes the alerting application 220 configured to generate the alert notification 250 based on the incoming call data included in the alerting signal 450 received over the WiFi network 820a and at least one of render the alert notification 250 on the GUI 202 or control the one or more speakers 204 to produce the audio signal 252 associated with the alert notification 250.

In other examples, the communication terminal 402 transmits the alerting signal 450 as a text message 450a and the mobile terminal 200 receives the text message 450a from the access point 802 via the WiFi network 820a. In these examples, the mobile terminal 200 provides the alert notification 250 by displaying the text message 450a upon the GUI 202 as described above with reference to FIG. 5A.

Referring to FIG. 8B, in some implementations, a base-station 120 (e.g., eNB) in communication with the communication terminal 402 receives the alerting signal 450 from the communication terminal 402 and provides the alerting signal 450 to the mobile terminal 200 over a 2G/3G network 820b. The mobile terminal 200 may receive the alerting signal 450 from the base-station 120 over the 2G/3G network 820b through roaming capabilities. In some examples, the mobile terminal 200 executes the alerting application 250 configured to generate the alert notification 250 based on the incoming call data included in the alerting signal 450 received over the 2G/3G network 820b and at least one of render the alert notification 250 on the GUI 202 or control the one or more speakers 204 to produce the audio signal 252 associated with the alert notification 250.

Figure 9:
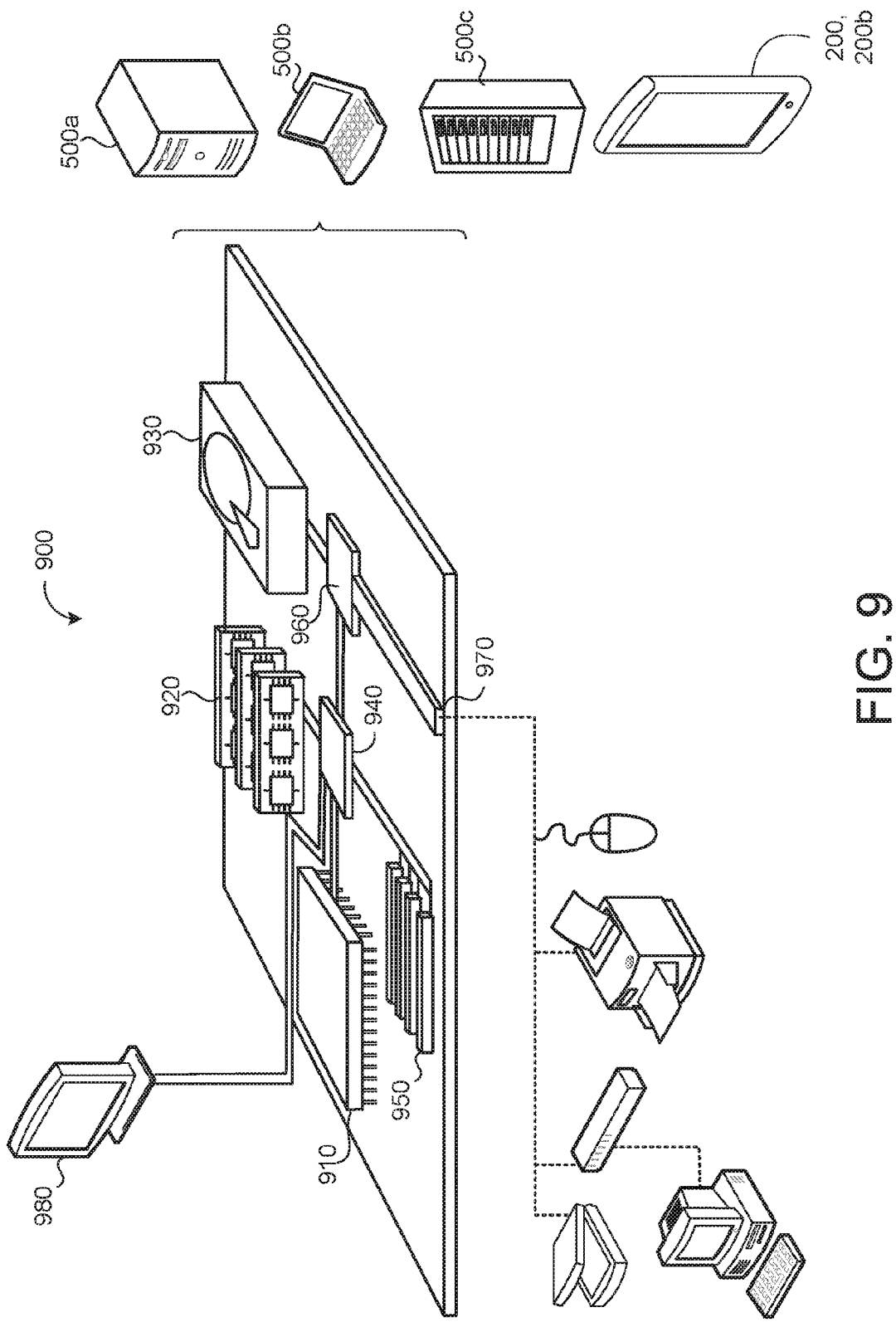
FIG. 9 is a schematic view of an example computing device.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosure described and/or claimed in this document.

The computing device 900 includes a processor 910 (e.g., data processing hardware), memory 920, memory hardware or a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor (e.g., data processing hardware) 910 can process instructions for execution within the computing device 900 (e.g., mobile terminal 200), including instructions stored in the memory 920 or on the storage device 930 to display graphical information for a graphical user interface (GUI) (e.g., GUI 202) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, as part of a rack server system 900c, or as a mobile terminal 200, 200b.

Figure 10:
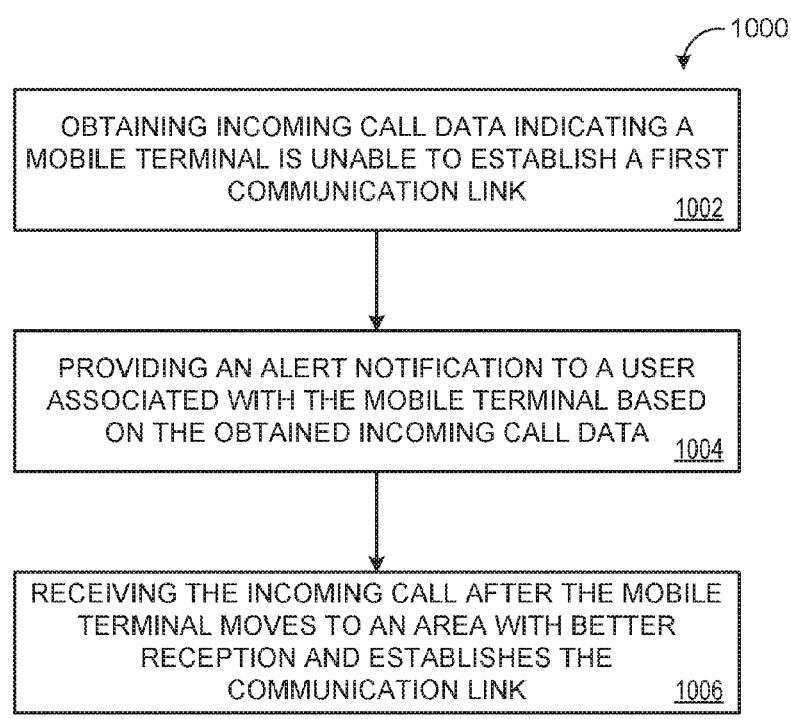
FIG. 10 is a flowchart of an example method for providing an alert notification to a user associated with a mobile terminal at a degraded location when an incoming call is pending.

FIG. 10 is a flowchart of an example method 1000 for providing an alert notification 250 to a user 32 associated with a mobile terminal 200 that informs the user 32 that an incoming call 412 directed toward the mobile terminal 200 is pending. The mobile terminal 200 may be located in a degraded location. The flowchart starts at operation 1002 where data processing hardware 910 of the mobile terminal 200 obtains incoming call data indicating that the mobile terminal 200 is unable to establish a first communication link 20a with a communication terminal 402 for receiving an incoming call 412 using VoLTE. The data processing hardware 910 may obtain the incoming call data by receiving an alerting signal 450 that includes the incoming call data from the communication terminal 402. The communication terminal 402 may transmit the alerting signal 450 through a high power spot beam 520 (FIGS. 5A and 5B) or a MBSFN channel 620 (FIG. 6). In the example of FIG. 8A, the data processing hardware 910 receives the alerting signal 450 over a WiFi network 820a from an access point 802 in communication with the communication terminal 402; while in the example of FIG. 8B, the data processing hardware 910 receives the alerting signal 450 over a 2G/3G network 820b from a base-station 120 in communication with the communication terminal 402. In some implementations, the data processing hardware 910 obtains the incoming call data by receiving modem parameters 262 from a modem 260 executing on the mobile terminal (FIG. 7). The modem parameters 262 may include an indication that a paging signal 410 has been received at the modem 260, a number of unsuccessful RACH attempts 264 by the modem, and/or a signal strength 266 of the modem 260.

At operation 1004, the data processing hardware 910 at the mobile terminal 200 provides the alert notification 250 to the user 32 associated with the mobile terminal 200 based on the obtained incoming call data. In examples when the alerting signal 450 includes a text message 450a containing the incoming call data, the mobile terminal 200 provides the alert notification 250 by displaying the text message 450a on a GUI 202 executing on the mobile terminal 200. In some examples, the data processing hardware 910 executes a software application 220 (e.g., alerting application) configured to generate the alert notification 250 based on the obtained incoming call data and at least one of render the notification 250 on the GUI 202, or control one or more speakers 204 of the mobile terminal 200 to produce an audio signal 252 associated with the alert notification 250.

At operation 1006, the data processing hardware 910 receives the incoming call 412 using VoLTE from the communication terminal 402 after the mobile terminal 200 moves from the degraded location to an area with better reception for establishing the first communication link 20a with the communication terminal 402.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation.

Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for providing an alert notification to a user at a degraded location, the method comprising:
   receiving, at data processing hardware of a mobile terminal, an alerting signal including incoming call data from a communication terminal after the communication terminal transmits a paging signal at a first power level or a first effective isotropic radiated power to the mobile terminal that requests the mobile terminal to establish a first communication link, the incoming call data indicating the mobile terminal is unable to establish the first communication link with the communication terminal for receiving an incoming call, wherein the communication terminal uses a high power spot beam to transmit the alerting signal at a second power level or a second effective isotropic radiated power greater than the first power level or the first effective isotropic radiated power of the paging signal;
   generating, by the data processing hardware, the alert notification in response to receiving the alerting signal;
   providing, by the data processing hardware, the alert notification to a user associated with the mobile terminal based on the obtained incoming call data by rendering the alert notification for display upon a graphical user interface executing on the mobile terminal or controlling one or more speakers of the mobile terminal to produce an audio signal associated with the alert notification, the alert notification informing the user that the incoming call directed toward the mobile terminal is pending; and
   receiving, at the data processing hardware, the incoming call from the communication terminal after the mobile terminal moves away from the degraded location and establishes the first communication link with the communication terminal.

2. The method of claim 1, wherein the communication terminal increases a gain associated with the high power spot beam relative to the paging signal to enable the mobile terminal to close an uplink with the communication terminal for receiving the alerting signal.

3. The method of claim 1, wherein:
   receiving the alerting signal comprises receiving a text message via the high power spot beam from the communication terminal, the text message providing at least one of:
      status information informing the user that the incoming call is currently pending;
      contact information associated with an originator of the incoming call; or
      location information informing the user that the mobile terminal is located in an area with poor reception; and
   providing the alert notification comprises displaying the text message on the graphical user interface executing on the mobile terminal.

4. The method of claim 1, further comprising:
   in response to receiving the alerting signal from the communication terminal:
      transmitting a connection request to the communication terminal to establish a second communication link with the communication terminal for receiving the incoming call; and
      receiving, at the data processing hardware, the incoming call from the communication terminal through the second communication link, the communication terminal using the high power spot beam to provide the incoming call through the second communication link.

5. The method of claim 1, wherein obtaining the incoming call data comprises executing, by the data processing hardware, an alerting application on the mobile terminal, the alerting application configured to:
   monitor a multicast-broadcast single-frequency network channel;
   receive the alerting signal directed toward the mobile terminal from the communication terminal on the multicast-broadcast single-frequency network channel; and
   generate the alerting notification based on the detected alerting signal.

6. The method of claim 5, wherein the communication terminal includes an antenna array providing multiple sectors, the communication terminal configured to at least one of increase a power level of the multicast-broadcast single-frequency network channel, increase the power level of the multicast-broadcast single-frequency network channel by transmitting the alerting signal from each sector, or increase the power level of the multicast-broadcast single-frequency network channel by transmitting the alerting signal from each sector and combining the alerting signal from each sector using cyclic delay diversity.

7. The method of claim 5, wherein the alerting application receives the alerting signal directed toward the mobile terminal by identifying a unique identifier associated with the mobile terminal included in the alerting signal.

8. The method of claim 5, wherein the alerting application monitors the multicast-broadcast single-frequency network channel according to a paging cycle when the mobile terminal is located within more than one multimedia broadcast/multicast service areas.

9. The method of claim 1, wherein obtaining the incoming call data comprises executing, by the data processing hardware, an alerting application on the mobile device, the alerting application configured to:
   receive modem parameters from a modem executing on the mobile terminal;

determine whether the modem parameters indicate multiple unsuccessful attempts by the modem to establish the first communication link with the communication terminal;

generate the alert notification when the received modem parameters indicate multiple unsuccessful attempts by the modem to establish the first communication link; and at least one of:

render the alert notification for display upon the graphical user interface executing on the mobile terminal; or control the one or more speakers of the mobile terminal to produce the audio signal associated with the alert notification.

10. The method of claim 9, wherein the altering application determines the modem parameters indicate multiple unsuccessful attempts by the modem to establish the first communication link when the received modem parameters comprise multiple unsuccessful random access channel attempts by the modem.

11. The method of claim 1, wherein obtaining the incoming call data comprises receiving, at the data processing hardware, the alerting signal including the incoming call data over a non-long term evolution network.

12. The method of claim 11, wherein the received alerting signal prompts an alerting application executing on the mobile terminal to generate the alert notification and at least one of:

render the alert notification for display upon the graphical user interface executing on the mobile terminal; or control the one or more speakers of the mobile terminal to produce the audio signal associated with the alert notification.

13. The method of claim 11, wherein:

receiving the alerting signal comprises receiving a text message over the non-long term evolution network, the text message providing at least one of:

status information informing the user that the incoming call is currently pending;

contact information associated with an originator of the incoming call; or location information informing the user that the mobile terminal is located in an area with poor reception; and providing the alert notification comprises displaying the text message on the graphical user interface executing on the mobile terminal.

14. A system for providing an alert notification to a user at a degraded location, the system comprising:

a communication terminal;

data processing hardware of a mobile terminal;

memory hardware in communication with the data processing hardware, the memory hardware storing instructions that when executed on the data processing hardware cause the data processing hardware to perform operations comprising:

receiving an alerting signal including incoming call data from a communication terminal after the communication terminal transmits a paging signal at a first power level or a first effective isotropic radiated power to the mobile terminal that requests the mobile terminal to establish a first communication link, the incoming call data indicating the mobile terminal is unable to establish the a first communication link with the communication terminal for receiving an incoming call, wherein the communication terminal uses a high power spot beam to transmit the alerting signal at a second power level or a second effective isotropic radiated power greater than the first power level or the first effective isotropic radiated power of the paging signal;

generating the alert notification in response to receiving the alerting signal;

providing the alert notification to the user associated with the mobile terminal based on the obtained incoming call data by rendering the alert notification for display upon a graphical user interface executing on the mobile terminal or controlling one or more speakers of the mobile terminal to produce an audio signal associated with the alert notification, the alert notification informing the user that the incoming call directed toward the mobile terminal is pending; and receiving the incoming call from the communication terminal after the mobile terminal moves away from the degraded location and establishes the first communication link with the communication terminal.

15. The system of claim 14, wherein the communication terminal increases a gain associated with the high power spot beam relative to the paging signal to enable the mobile terminal to close an uplink with the communication terminal for receiving the alerting signal.

16. The system of claim 14, wherein:

the receiving the alerting signal comprises receiving a text message via the high power spot beam from the communication terminal, the text message providing at least one of:

status information informing the user that the incoming call is currently pending;

contact information associated with an originator of the incoming call; or location information informing the user that the mobile terminal is located in an area with poor reception; and the providing the alert notification comprises displaying the text message on the graphical user interface executing on the mobile terminal.

17. The system of claim 14, wherein the operations further comprise:

in response to receiving the alerting signal from the communication terminal:

transmitting a connection request to the communication terminal to establish a second communication link with the communication terminal for receiving the incoming call; and receiving the incoming call from the communication terminal through the second communication link, the communication terminal using the high power spot beam to provide the incoming call through the second communication link.

18. The system of claim 14, wherein obtaining the incoming call data comprises executing an alerting application on the mobile terminal, the alerting application configured to:

monitor a multicast-broadcast single-frequency network channel;

receive the alerting signal directed toward the mobile terminal from the communication terminal on the multicast-broadcast single-frequency network channel; and generate the alerting notification based on the detected alerting signal.

19. The system of claim 18, wherein the communication terminal includes an antenna array providing multiple sectors, the communication terminal configured to at least one of increase a power level of the multicast-broadcast single-frequency network channel, increase the power level of the multicast-broadcast single-frequency network channel by transmitting the alerting signal from each sector, or increase the power level of the multicast-broadcast single-frequency network channel by transmitting the alerting signal from each sector and combining the alerting signal from each sector using cyclic delay diversity.

20. The system of claim 18, wherein the alerting application receives the alerting signal directed toward the mobile terminal by identifying a unique identifier associated with the mobile terminal included in the alerting signal.

21. The system of claim 18, wherein the alerting application monitors the multicast-broadcast single-frequency network channel according to a paging cycle when the mobile terminal is located within more than one multimedia broadcast/multicast service areas.

22. The system of claim 14, wherein obtaining the incoming call data comprises executing an alerting application on the mobile terminal, the alerting application configured to:
receive modem parameters from a modem executing on the mobile terminal;
determine whether the modem parameters indicate multiple unsuccessful attempts by the modem to establish the first communication link with the communication terminal;
generate the alert notification when the received modem parameters indicate multiple unsuccessful attempts by the modem to establish the first communication link; and at least one of:
render the alert notification for display upon the graphical user interface executing on the mobile terminal; or
control one or more speakers of the mobile terminal to produce the audio signal associated with the alert notification.

23. The system of claim 22, wherein the altering application determines the modem parameters indicate multiple unsuccessful attempts by the modem to establish the first communication link when the received modem parameters comprise multiple unsuccessful random access channel attempts by the modem.

24. The system of claim 14, wherein obtaining the incoming call data comprises receiving the alerting signal including the incoming call data over a non-long term evolution network.

25. The system of claim 24, wherein the received alerting signal prompts an alerting application executing on the mobile terminal to generate the alert notification and at least one of:
render the alert notification for display upon the graphical user interface executing on the mobile terminal; or
control the one or more speakers of the mobile terminal to produce the audio signal associated with the alert notification.

26. The system of claim 24, wherein:
the receiving the alerting signal comprises receiving a text message over the non-long term evolution network, the text message providing at least one of:
status information informing the user that the incoming call is currently pending;
contact information associated with an originator of the incoming call; or
location information informing the user that the mobile terminal is located in an area with poor reception; and
the providing the alert notification comprises displaying the text message on the graphical user interface executing on the mobile terminal.

* * * * *